(12) United States Patent         (10) Patent No.:     US 6,745,983 B2
Taylor                             (45) Date of Patent:     Jun. 8, 2004

(54) INTEGRATED TANKAGE FOR PROPULSION VEHICLES AND THE LIKE

(76) Inventor: Zachary R. Taylor, 5530 Vista Cantora, Yorba Linda, CA (US) 92887

( * ) Notice: Subject to any disclaimer, the term of this patent is extended or adjusted under 35 U.S.C. 154(b) by 0 days.

(21) Appl. No.: 10/335,406

(22) Filed: Dec. 31, 2002

(65) Prior Publication Data

US 2003/0093987 A1 May 22, 2003

Related U.S. Application Data

(62) Division of application No. 09/577,394, filed on May 25, 2000, now Pat. No. 6,499,287.

(51) Int. Cl.$^7$ .............................. F02K 9/42; B64D 37/08
(52) U.S. Cl. ............... 244/135 R; 244/172; 220/560.11
(58) Field of Search .................... 244/135 R, 135 B, 244/172; 280/830; 220/560.08, 560.1, 560.11; 210/321.64

(56) References Cited

U.S. PATENT DOCUMENTS

| | | | |
|---|---|---|---|
| 1,007,828 A | * 11/1911 | Webb | 220/567.2 |
| 3,097,766 A | 7/1963 | Biehl et al. | 222/135 |
| 3,214,906 A | 11/1965 | Coleal | 60/204 |
| 3,304,724 A | 2/1967 | Blumrich et al. | 60/257 |
| 3,353,358 A | 11/1967 | Lovingham | 60/259 |
| 3,374,623 A | 3/1968 | Crosswhite et al. | 60/39.48 |
| 3,426,529 A | 2/1969 | Kirchner, III et al. | 60/39.48 |
| 4,561,568 A | 12/1985 | Hoffmeister et al. | 222/130 |
| 4,723,736 A | 2/1988 | Rider | 60/259 |
| 4,947,963 A | * 8/1990 | Aho, Jr. | 184/6 |
| 5,085,343 A | 2/1992 | Scarr | 220/445 |
| 5,383,566 A | 1/1995 | Johnson | 220/562 |
| 5,961,074 A | * 10/1999 | Dunn | 244/135 R |
| 6,036,144 A | 3/2000 | Sisk | 244/172 |
| 6,499,287 B1 | 12/2002 | Taylor | 60/204 |

FOREIGN PATENT DOCUMENTS

DE         41 12 623 A1  * 10/1992    ............. F02K/9/60

* cited by examiner

Primary Examiner—Robert P. Swiatek
(74) Attorney, Agent, or Firm—Madson & Metcalf

(57) ABSTRACT

Apparatus and methods for integrating structural members inside the body of a propulsion vehicle with tankage used to store fluid propellant and the like. Propulsion vehicles may be made lighter, more compact, cheaper, and easier to manufacture by using pressurized membranes of the tankage to accomplish other structural purposes. More specifically, tanks may be integrated with thrust structures to transfer thrust loads from the engine to the main body of the vehicle. Alternatively, the tanks may be integrated with the vehicle engine. Also, one tank may be integrated with one or more other tanks to form a single pressure vessel with multiple interior chambers. Tankage may additionally be combined with more than one of the foregoing to save additional weight and space. Methods of manufacturing a metallic integrated tank assembly include weld fabrication, machining, spinning, hydroforming, casting, forging, plating, metal deposition, or some combination thereof. Methods of manufacturing a composite integrated tank assembly include filament winding, fiber placement, hand-lay-up, or some combination. The methods listed above may be combined with other steps and tooling to create many different embodiments of the invention.

8 Claims, 13 Drawing Sheets

INTEGRATED TANKAGE FOR PROPULSION VEHICLES AND THE LIKE

This is a divisional of application Ser. No. 09/577,394, filed May 25, 2000, and now U.S. Pat. No. 6,499,287 B1.

BACKGROUND OF THE INVENTION

1. The Field of the Invention

The present invention relates to pressure vessels for carrying pressurized fluids. More specifically, the present invention relates to tanks designed to support an external, compressive load as well as the pressure of the fluid, for use in applications in which lightweight storage and structural members are desirable.

2. The Relevant Technology

Pressure vessels, or storage tanks, are commonly used to store fluids under pressure. Many types of propulsion vehicles require some type of fluid storage. For example, many types of launch vehicles, spacecraft, missiles, satellites, and rocket-propelled torpedoes all store a fluid propellant. Liquid fuel rocket motors typically require tanks of pressurized, combustible fluids that can be combusted and ejected from a nozzle to propel the rocket. Many forms of electric propulsion also require a pressurized fluid propellant. The term "fluid" includes both gases and liquids; many rockets store fuels in a substantially liquid form, with a component of combustible vapor. Additionally, rockets have a number of other structural features necessary for the rocket's operation. For example, rockets may have additional tanks, nozzles to direct exhaust gases, and thrust structures designed to convey force from the nozzle to the main body of the rocket. Typically, the inside of a rocket is a mass of tubes, tanks, wiring, and fixtures.

The cost and performance requirements that rockets typically operate under frequently dictate the use of lightweight, compact components. As a result, it is desirable to minimize mass and eliminate as much unnecessary structure as possible. Many vehicle applications are also volume sensitive and require that wasted space within the vehicle be minimized wherever possible. Tanks known in the art, however, are not well-suited to compact assembly, in part because they are often shaped with symmetrical, convex walls. Consequently, space between independent tanks and requisite inter-tank structure is typical. Furthermore, tanks known in the art create an enormous blockage through which it is difficult to route wiring, plumbing, conduits, and structural features necessary for operation of the rocket. The complexity of the rocket design is compounded because every other component of the rocket must be designed around the tank.

Furthermore, rockets often contain multiple tanks to hold different fluids, such as an oxidizer and a fuel. For example, oxygen may be stored in one tank, and a suitable liquid fuel in the other, so that the two may be combined to combust even in a vacuum. The use of multiple tanks adds additional complexity, volume, and weight to the rocket. A liquid-fueled rocket must typically carry two tanks, even though the fluids contained in the tanks are stored at similar pressures and will often be routed to the same location.

Consequently, there is a need, unfulfilled by the prior art, for part count reduction and for space and weight conserving tankage that can be effectively positioned within the body of a rocket or a similar propulsion vehicle, without hindering the placement of necessary equipment. There is a further need for space-saving configurations and structures that can be effectively used with tankage for the vehicle. The tankage and structures should be easily manufactured at low expense, and easy to assemble. Furthermore, the tankage and structures should be sturdy enough to tolerate the stresses created by high acceleration and vibration.

Similarly, there is a need for novel methods of manufacture, through which improved tankage and structures can be created, assembled, and installed in a propulsion vehicle. Such methods should be rapid, inexpensive, and preferably utilize available tooling with little modification.

The current invention discloses such an apparatus and method.

BRIEF SUMMARY OF THE INVENTION

The apparatus of the present invention has been developed in response to the present state of the art, and in particular, in response to the problems and needs in the art that have not yet been fully solved by currently available tankage and propulsion vehicle structures. Thus, it is an overall objective of the present invention to provide tankage and propulsion vehicle structures that overcome the deficiencies in the prior art.

To achieve the foregoing objective, and in accordance with the invention as embodied and broadly described herein in the preferred embodiment, integrated tankage for propulsion vehicles and the like is provided. The integrated tankage comprises a wall, or pressurized membrane, at least a portion of which is specifically engineered to serve a function besides containment of the fluid within the tank.

For example, a thrust structure for a propulsion vehicle connects the engine to the main body of the rocket. When the rocket ignites, the engine pushes the rocket forward, and the thrust structure must bear the compressive stress induced by the force of the engine. The engine typically terminates, at its lower (aft) end, in an orifice, or nozzle, through which exhaust gases may pass to propel the rocket. The thrust structure connects the engine to the main body of the rocket, which is typically a cylindrical outer housing. The thrust structure is specially designed to support all engine loads while minimizing weight and bulk.

A tank may be properly situated and constructed to connect the nozzle with the main body of the rocket, such that a separate, thrust structure external to the tank is not necessary. The outer pressurized membrane of the tank may be configured so as to transfer the compressive force of the engine to the body, or an inner, tubular and/or conical structure within the tank may be connected to the nozzle to carry the compressive force. If a tank-internal structure penetrates the pressurized membrane of the tank, the two structures may be mechanically uncoupled, and a compliant liner or seal such as an O-ring seal or rod packing may be used at their juncture in such a way that the two structures may deform at different rates without leakage of internal fluid.

In the alternative, the engine itself may be integrated with the tank, such that the lower (aft) end of the tank is shaped to form a nozzle. In such a configuration, the pressure of expanding exhaust gases in the nozzle would impinge directly on the aft pressurized membrane of the tank, so that the tank supports the nozzle. A separate thrust structure may then be provided to connect the engine to the main body of the rocket, or the tank may also transmit the force of the engine directly, thus enabling integration of both the engine and the thrust structure into the tank. The nozzle may be of a conventional type, or may have an annular, "aerospike" design. A compliant liner or seal between the engine or thrust structure and outer pressurized membrane may be employed to permit varying rates of strain, as described above.

As a further alternative, a tank may have an internal wall adapted to form a bulkhead between nested internal chambers, thereby merging abutting pressure vessels to form a single lighter, simpler structure. Since pressures on either side of the bulkhead will be typically closer to each other than to the ambient pressure outside the tank, the bulkhead can be made thinner than the outer vessel wall. The weight associated with two abutting domes and associated intertank structure may be largely eliminated. A tube or other extension of one chamber may pass through a second chamber so as to allow access to both fluids from one end of the common-bulkhead tank. This tube or extension may be an integral part of the bulkhead. Again, the internal bulkhead or bulkhead extension tube and tank wall may be mechanically uncoupled at one end, and a compliant liner or sealing member may be used at their juncture, allowing the two structures to deform or translate with respect to each other without leakage of internal fluid. Furthermore, the fluid-separating bulkhead and extension tube may also be configured as tank-integral, engine thrust structure.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1A:
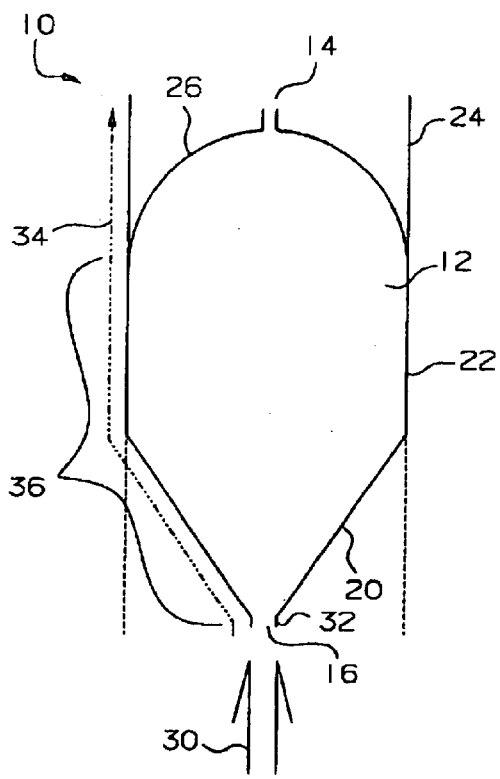
FIGS. 1(a) through (h) are sectional views of various embodiments of a portion of a vehicle incorporating an integrated tank and thrust structure according to the invention.

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 11, is not intended to limit the scope of the invention, as claimed, but is merely representative of presently preferred embodiments of the invention.

The present invention includes novel configurations and methods for using pressure vessels to perform structural, load-bearing functions. More specifically, propellant tanks in rockets are integrated with interior structural features of a rocket, including but not limited to thrust structures, engines, and bulkheads.

Pressure vessels, or tanks, designed to hold a fluid under high pressure are subject to unique stresses. Axial and "hoop," or circumferential, tensile stresses build in the walls, or pressurized membranes, as the fluid presses outward. Consequently, pressure vessels are already preloaded with a considerable tensile stress. Placing a compressive load on them does not increase the total stress level if the load is properly applied. Rather, external, distributed compressive loads applied to a pressure vessel tend to negate the tensile stresses caused by the pressure of fluid within the tank.

As a result, pressurized tanks are well suited for bearing such distributed compressive loads because the pressurized membranes need not be made any thicker or stronger to withstand the additional load. This makes them good candidates for performing additional structural functions, especially in space-limited applications such as propulsion vehicles. The following figures illustrate how pressure vessels can be integrated with internal structural features of a propulsion vehicle.

"Internal structural features" includes thrust structures, engines, bulkheads, and other members within the main body of the vehicle that bear an additional substantial load besides that induced by the pressure of the fluid within the tank. "Thrust structure" refers to one or more members that transmit thrust from the engine to the main body of the vehicle. "Pressurized membrane" refers to any fluid pressure-bearing portion of the wall of a pressure vessel or tank. "Dome" refers to the structure that forms either end of a tank, regardless of its shape or method of fabrication. "Integrated" components need not be integrally fabricated or unitary; they must simply abut each other in at least one surface of substantial size. "Main body" refers to a casing substantially enclosing all of the internal components of a rocket, or, in the event that the casing is unitary with propellant tanks, all parts of the casing located forward of the tanks. "Polar fitting" refers to a connection located at either a forward or an aft dome of the tank designed to convey a load to the tank or receive a load from the tank. The polar fitting may connect to an exterior feature, such as a dome, or an interior feature such as an interior passageway or support inside the tank.

Engine thrust structure may be incorporated into the vehicle tankage either as part of the pressurized membrane of the vessel, or extending through the fluid storage chamber. This assumes that a typical lower vessel head (dome) and polar fitting are not sufficiently strong or stiff to support the engine thrust loads on their own.

Inclusion of the thrust structure as part of the pressurized membrane may be accomplished by incorporating a conical, truncated cone, cylindrical, or other appropriate engineered shaped thrust structure shell into the vessel wall. The thrust structure could, in effect, replace a vessel dome, and may extend out from the tank so as to be pressurized internally, or penetrate into the tank volume so as to be loaded in external compression.

Referring to FIGS. 1(a) through 1(h), several possible embodiments of the integrated tank and thrust structure are shown, in which the engine thrust structure is part of the pressurized membrane of the vessel. The configurations shown in FIGS. 1(c) through 1(h) have a thrust structure that is at least partially loaded in external compression. Fibers with high compressive strength, such as boron fibers, may be used in the fabrication of externally compressed composite thrust structures. A few options for fluid access are also shown. Access may be achieved through openings in the tank dome, through the thrust structure, or through the outer tank wall.

In FIG. 1(a), portion of a vehicle 10 includes a tank 12 with a gas inlet 14 and a fluid outlet 16, which receive gas and expel propellant, respectively, in the case of a rocket. The lower vessel head 20, or dome 20, takes the form of a flared dome 20, which is conical in shape and extends outward from the fluid outlet 16 to reach the outer wall 22 of the tank 12. In the following descriptions, "flared" and "conical," as used with reference to tank domes, are defined with reference to the direction of the thrust load. A dome that begins close to the central axis of the tank, and then spreads out to the outer wall 22 in a forward direction, or along the direction of the thrust load, is "flared." Similarly, a dome that begins at the outer wall 22, and then narrows toward the axis of the tank in a forward direction, is "tapered."

The flared dome 20 and the outer wall 22 may be separate pieces assembled before installation in the vehicle 10, or they may be integrally fabricated. The outer wall 22 is preferably unitary with the main body 24 of the vehicle 10. An upper vessel head 26, or rounded dome 26, extends inward from the outer wall 22 to reach the gas inlet 14.

Engine thrust, represented by arrows 30, received from an engine located aft of the tank 12, impinges upon a polar fitting 32 proximate the fluid outlet 16. The compressive stress induced by the engine thrust 30 travels along a thrust load path 34 through the flared dome 20 to reach the outer wall 22 of the tank 12 and the main body 24 of the vehicle. Consequently, in this embodiment, the flared dome 20 and the outer wall 22 constitute the thrust structure 36 for the vehicle 10. The thrust structure 36 is thus integrated with the tank. If needed, the flared dome 20 may be thickened or otherwise reinforced to bear the compressive force of the engine thrust 30 along the thrust load path 34. Generally, the thrust structure includes any structures within the thrust load path 34 between the engine and the main body of the vehicle. Since the tank 12 is generally radially symmetrical about the axis of the vehicle 10, the thrust load path extends not along a single linear pathway, but around the full circumference of the tank 12.

Figure 1B:
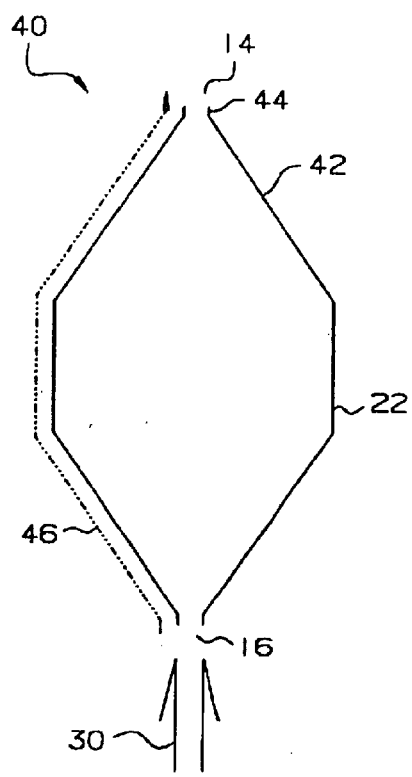

In FIG. 1(b), the rounded dome 26 of FIG. 1(a) has been replaced by a tapered dome 42, which is also conical in shape. This embodiment is different in operation from that disclosed previously because the thrust load path 46, in this case, extends through the tapered dome 42 to reach a polar fitting 44 proximate the gas inlet 14. The polar fitting 44 will then transfer the thrust to the main body (not shown) of the vehicle 40. The outer wall 22 may be decoupled from the main body of the vehicle 40, so as not to bear any of the engine thrust 30.

Figure 1C:
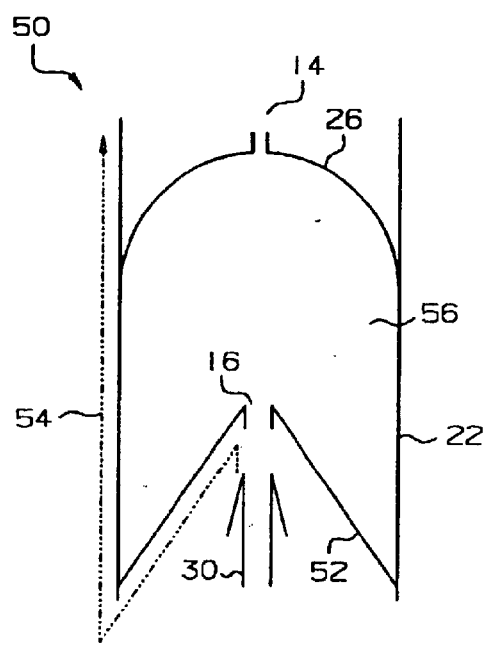

In FIG. 1(c), the flared dome 20 of FIG. 1(a) has been replaced with a tapered dome 52, which carries the thrust load path 54 of the vehicle 50. Since the tapered dome 52 extends into the tank 56, it bears a tensile load from the engine thrust 30, which adds to the tensile load caused by the pressure of fluid in the tank 56. Consequently, the tapered dome 52 may need to be made thicker to bear the externally compressive stresses due to fluid pressure. However, such a configuration may be advantageous in that there is open space for components aft of the tapered dome 52.

Figure 1D:
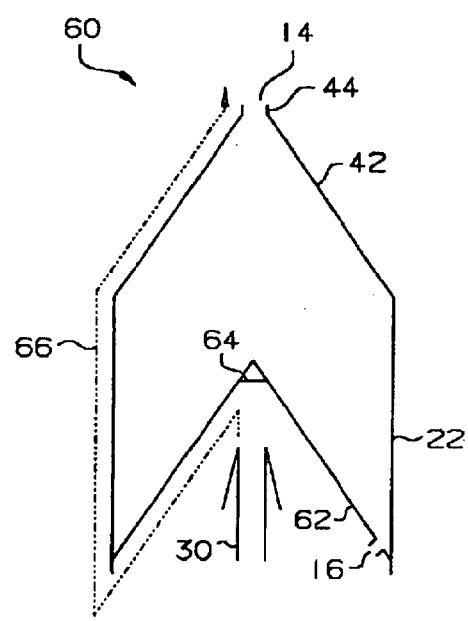

In FIG. 1(d), a tapered dome 42 is combined with a tapered dome 62 having a closed polar fitting 64, which receives engine thrust 30 apart from the fluid outlet 16, which may be located elsewhere on the tapered dome 62. The thrust load path 66 then travels through the tapered dome 62, the outer wall 22, and the tapered dome 42 to reach a polar fitting 44 similar to that described in connection with FIG. 1(b).

Figure 1E:
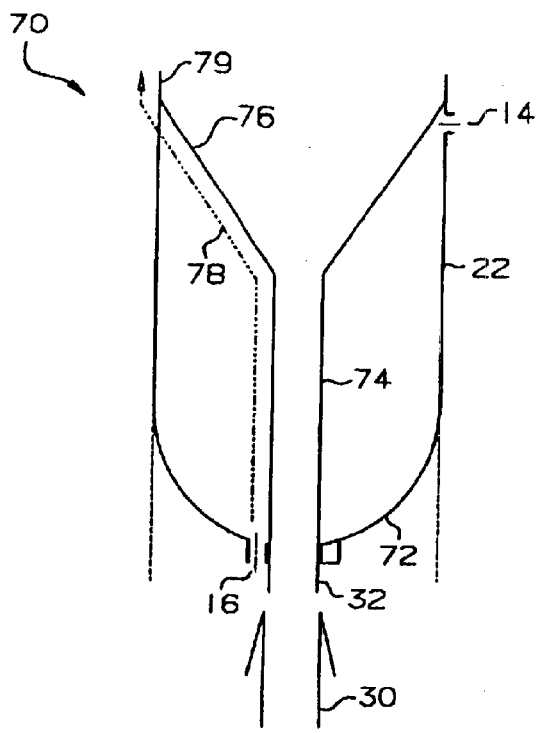

In FIG. 1(e), a rounded dome 72 is provided, with an opening through which an interior passageway 74 extends to exit through a flared dome 76. The interior passageway 74 may convey fluids, control lines, or other equipment to and from the engine (not shown). Furthermore, as embodied in FIG. 1(e), the interior passageway 74 carries the thrust load path 78 to the flared dome 76, which then conveys the thrust load to the main body 79. The gas inlet 14 and the fluid outlet 16 are offset to accommodate the interior passageway 74.

Figure 1F:
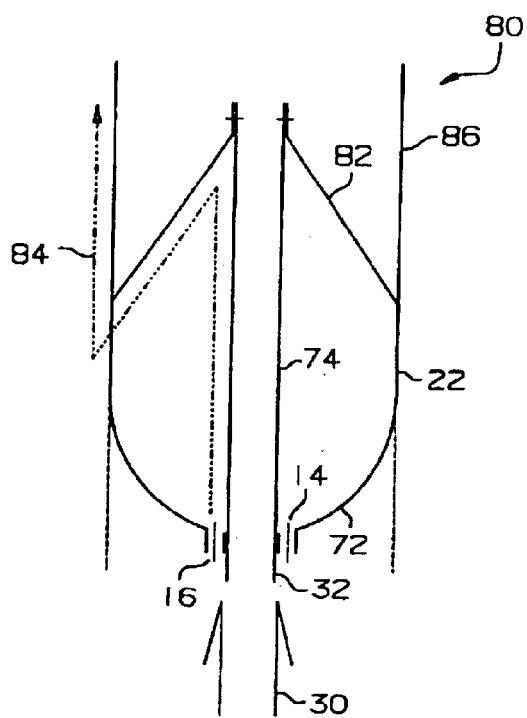

In FIG. 1(f), the interior passageway 74 is also included, but the flared dome 76 has been replaced by a tapered dome 82. The gas inlet has been positioned near the polar fitting 32 on the rounded dome 72. The thrust load path 84 thus extends through the interior passageway 74 and the tapered dome 82 to reach the main body 86.

Figure 1G:
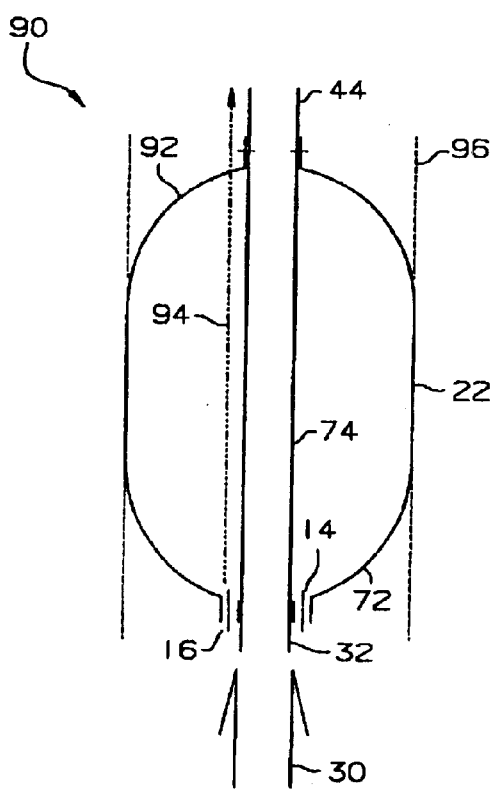

In FIG. 1(g), a rounded dome 92 with an opening for the interior passageway 74 is used with the rounded dome 72. The interior passageway 74 extends from the rounded dome 72, completely through the rounded dome 92, to carry the thrust load path 94 to a polar fitting 44. The polar fitting 44 is then coupled to the main body 96.

Figure 1H:
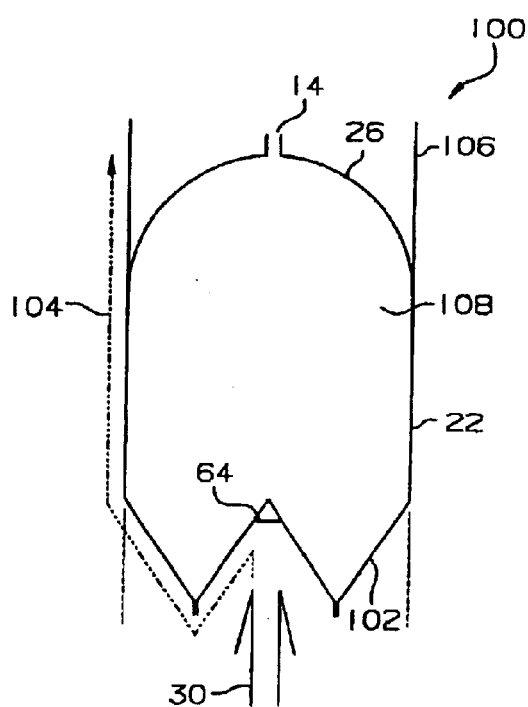

In FIG. 1(h), the rounded dome 72 has been replaced by an indented dome 102 with a closed polar fitting 64. The thrust load path 104 extends through the indented dome 102 to reach the main body 106 of the vehicle 100. The indented dome 102 may be a useful configuration for interfacing with other interior components aft of the tank 108.

As described above, configurations (e), (f), and (g) have thrust structures that extend through the middle of the tank, creating a second pressure load path from end to end. In order to allow vessel strain due to pressure to occur unimpeded by this type of thrust structure, the two structures may be uncoupled at one end, allowing the two structures to strain at different rates and translate with respect to each other. To prevent leakage between the two structures, a plastic or elastomeric liner may be used to contain the fluid, or an O-ring, lip-type seal, or rod packing may be used between the two translating surfaces.

Figure 2A:
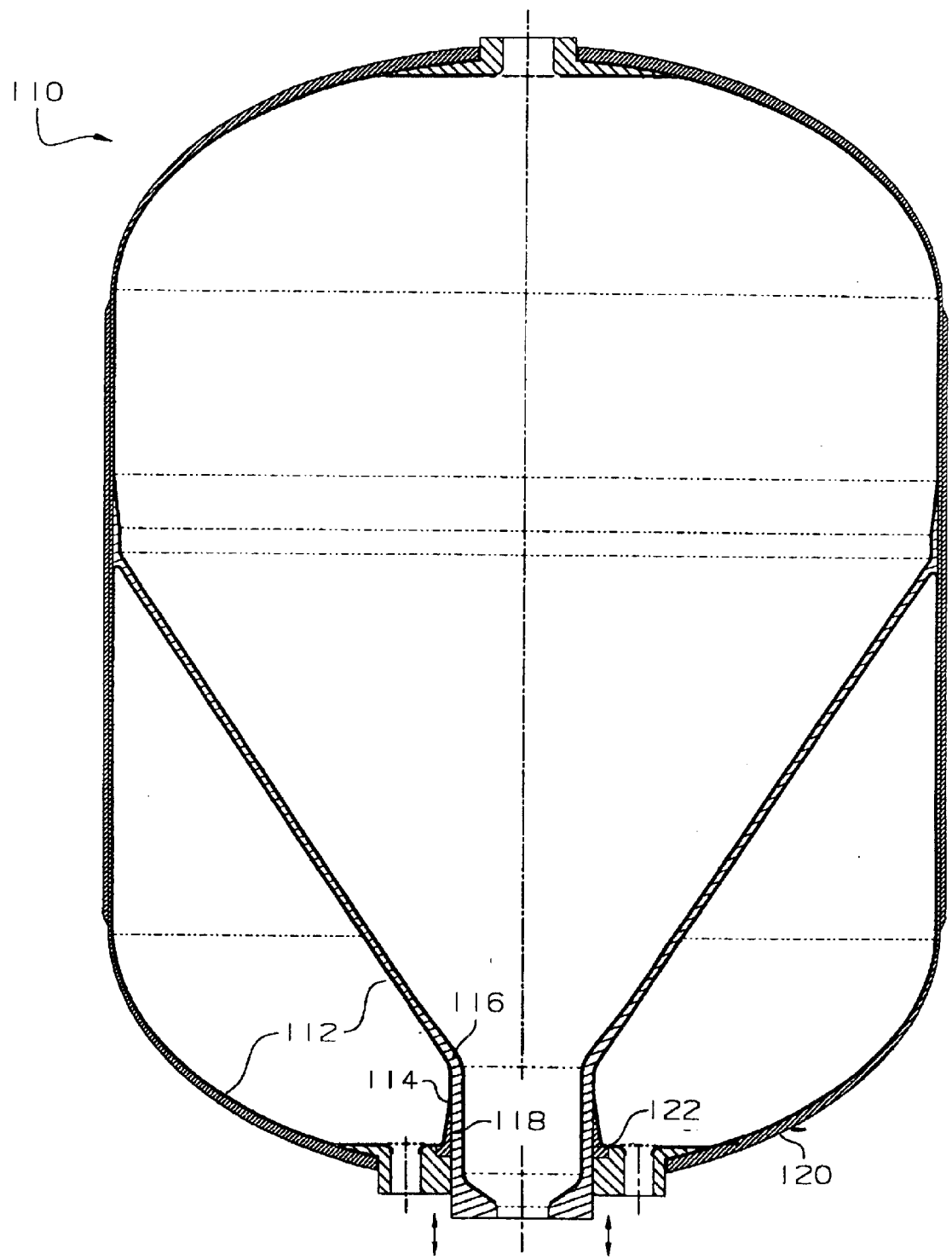
FIGS. 2(a) through (c) are sectional views of a tank and polar fitting with (a) a compliant liner, (b) an O-ring type seal, and (c) rod packing internal structural seals.
Figure 2B:
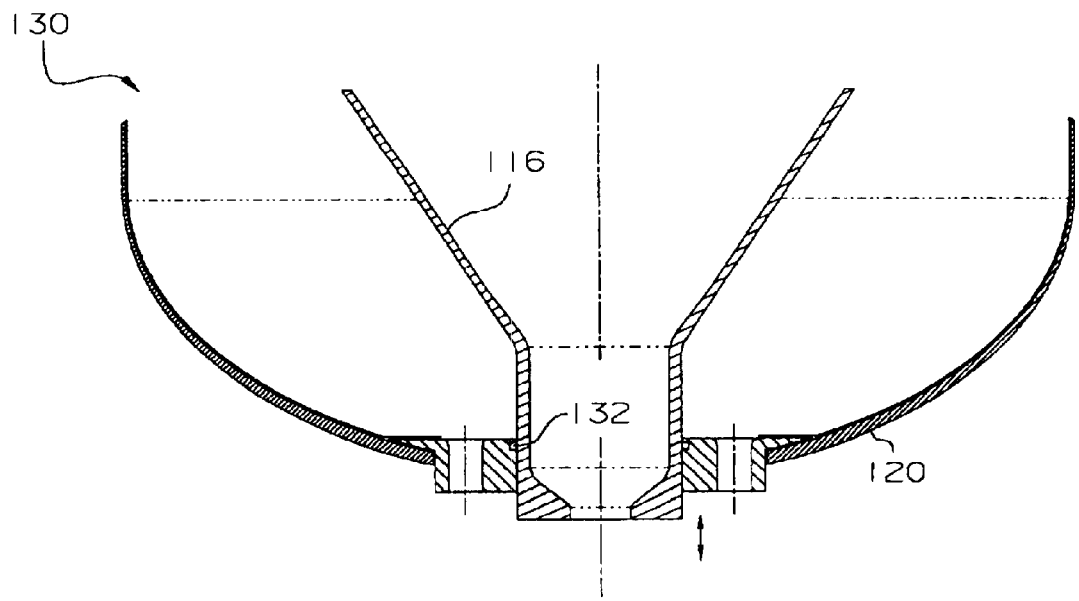
Figure 2C:
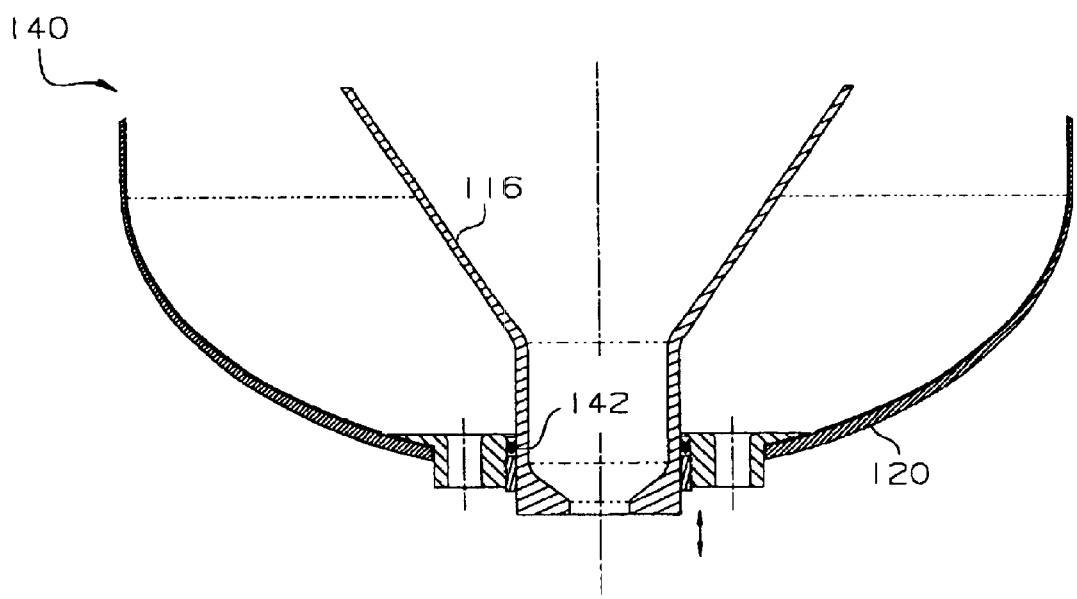

Referring to FIGS. 2(a) through (c), an aft portion of a tank with an exemplary liner, O-ring, or other seal is shown, as may be incorporated into FIGS. 1(e), 1(f), or 1(g). More specifically, FIG. 2(a) shows one way in which a plastic or elastomeric liner 112 may be configured in a vehicle 110. The liner 112 has an annular shape with an integral lined hole 114 extending through its center. This integral lined hole 114 of the liner 112 is supported by the thrust structure 116 (bulkhead or other internal supporting feature 116) but is not bonded to the supporting feature 116 near the meeting point 18 of the dome 120 and the supporting feature 116. This allows the un-bonded liner to compress and stretch as the supporting feature 116 translates in and out of the dome 120. A compliant pad 122 near the meeting point 118 between the liner 112 and support structure 116 may help distribute local liner strain.

FIG. 2(b) shows a similar tank 130 with an O-ring seal 132 instead of a liner with an inner penetration. The O-ring seal 132 may comprise one or more O-rings in sealable engagement with the supporting feature 116 and the dome 120. As with FIG. 1(a), the supporting feature 116 and the dome 120 are able to slide relative to each other to accommodate different rates of strain. FIG. 2(c) depicts a similar tank 140 with a rod packing type seal 142. As with FIGS. 2(a) and 2(b), the supporting feature 116 is able to slide in and out of the dome 120. The rod packing 142 serves essentially the same function as the O-ring seal 132, it permits relative translation while maintaining a fluid seal. Any variety of seal types may be used depending on the operating pressures and anticipated relative movement.

Transitioning the thrust load path directly through the fluid storage area may be accomplished by incorporating a conical, truncated cone, or cylindrical thrust structure into the tank's interior where both sides of the structure are exposed to fluid pressure. The purpose of this thrust structure would be to transfer engine thrust loads from the engine to the outer surface of the tank or the opposite dome. Internal thrust structure may also be used to transfer loads from the engine or outer surface of the tank to a payload attachment/interface at or beyond the forward dome. This thrust structure may also double in function as a separating membrane or bulkhead between two propellant fluids. This would further reduce the part count by consolidating two or more tanks into one tank with multiple internal chambers.

Figure 3A:
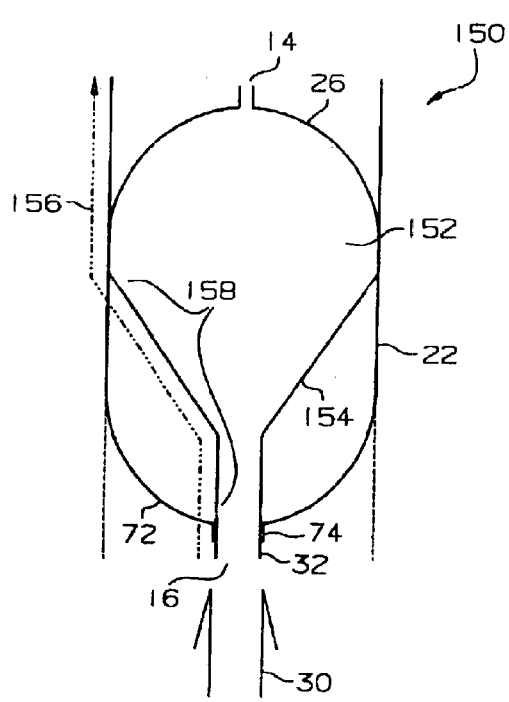
FIGS. 3(a) through (d) are sectional views of a portion of a vehicle incorporating an integrated tank and thrust structure, wherein the thrust structure is an internal feature of the tank.

Referring to FIGS. 3(a) through 3(d), a few tank configurations showing the use of an internal thrust structure are illustrated. More specifically, FIG. 3(a) shows a vehicle 150 with a tank 152 with a polar fitting 32 receiving engine thrust force 30. As with FIG. 1(g), a rounded dome 72 is provided, with an opening for an interior passageway 74. The tubular polar fitting 32 flares into an internal thrust structure 154 and carries the thrust load path 156 into the outer wall 22. Vents 158 are provided in the flared support 154 to allow passage of a single fluid on both sides of the flared support 154.

Figure 3B:
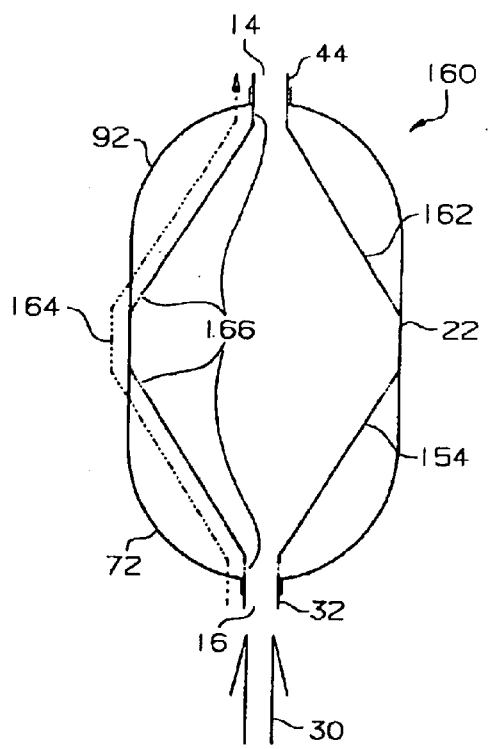

In FIG. 3(b), a tapered support 162 has been added, so that the thrust load path 164 extends through the flared support 154, the outer wall 22, and then the tapered support 162. As with the configurations of FIG. 1(e), 1(f), and 1(g), a polar fitting 44 has been provided to further transmit the thrust load path 164 to the main body (not shown) of the vehicle 160. As with FIG. 3(a), vents 166 have been provided in the flared support 154, and also in the tapered support 162, to permit fluid communication across the flared support 154 and the tapered support 162.

Figure 3C:
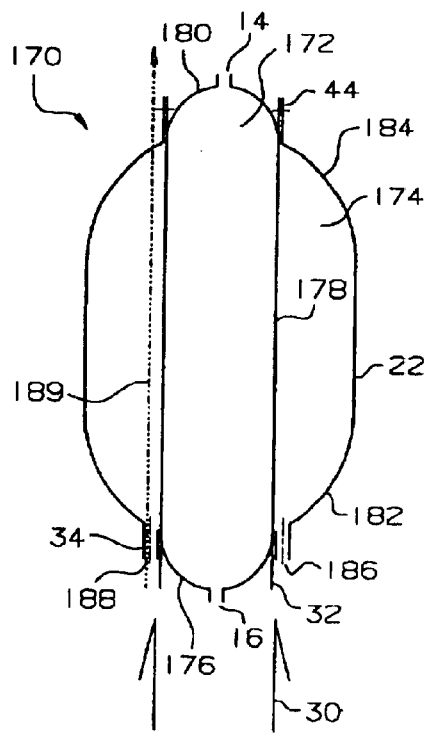

In FIG. 3(c), a tank/structure 170 is configured to contain two different fluids separated by an internal thrust structure. In this embodiment, a first tank 172 and a second tank 174 are provided. The first tank has a rounded dome 176 situated within the polar fitting 34, an interior wall 178, and a rounded dome 180 situated within the forward polar fitting 44. The gas inlet 14 is located on the rounded dome 180, and the fluid outlet 16 is on the rounded dome 176. The second tank 174 is annular in shape and is disposed around the first tank 172. From the interior wall 178, rounded annular caps 182, 184 extend outward to reach the outer wall 22. The second tank 174 is equipped with its own gas inlet 186 and gas outlet 188. The thrust load path 189 extends straight through the interior wall 178 to reach the polar fitting 44. Because the first and second tanks 172 and 174 are entirely sealed from each other, they may contain two separate fluids.

Figure 3D:
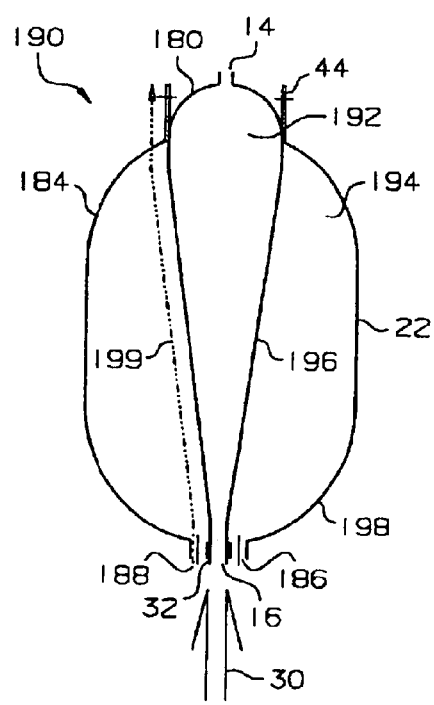

FIG. 3(d), an alternative embodiment of a vehicle 190 is shown, incorporating a dual-tank design. A first tank 192 is conical in shape, and a second tank 194 is roughly annular, with a conical interior accommodating the first tank 192. The fluid outlet 16 of the first tank 192, which may act as the polar fitting 32, leads directly to a flared support 196, which broadens to reach the polar fitting 44, within which the rounded dome 180, with the gas inlet 14, is disposed. A rounded annular dome 198 is provided with a gas inlet 186 and a fluid outlet 188, and extends outward to the outer wall 22. As with FIG. 3(c), a rounded annular dome 184 connects the outer wall 22 to the first tank 192 and the polar fitting 44. The thrust path 199 goes through the polar fitting 32, through the flared support 196, and through the polar fitting 44 to reach the main body (not shown) of the vehicle 190 or a payload attachment fitting.

In order to allow vessel strain due to pressure to occur unimpeded by the thrust structure, the two structures may be uncoupled at one end of a given thrust structure, allowing the two structures to strain at different rates and translate with respect to each other. In order to prevent leakage between the two structures, a plastic or elastomeric liner may be used to contain the fluid, or an O-ring, lip-type, rod packing type, or other seal may be used between the two translating surfaces as shown in FIGS. 2(a) through 2(c).

Vehicle length, volume, weight, and part count may also be reduced by incorporating all or part of the vehicle's engine into the tankage as part of the pressurized membrane. The engine's injector head may become, or be attached directly to, a tank polar fitting and minimize required plumbing. Thrust vectoring for this configuration may be accomplished through the use of an articulating nozzle (rubber/shim joint) similar to those used on many solid rocket motors.

Incorporating the engine's chamber and nozzle into the tankage may be especially beneficial for upper stages and spacecraft that may use large engine nozzles, but requires that the engine be fixed (non-vectorable) with respect to the tank. Thrust vectoring for this type of configuration may be accomplished by controlled fuel injection into areas of the nozzle, by vanes or paddles redirecting the exhaust, by a separate reaction control system, or by articulating the tank in which the engine is installed or other area of the vehicle.

Figure 4:
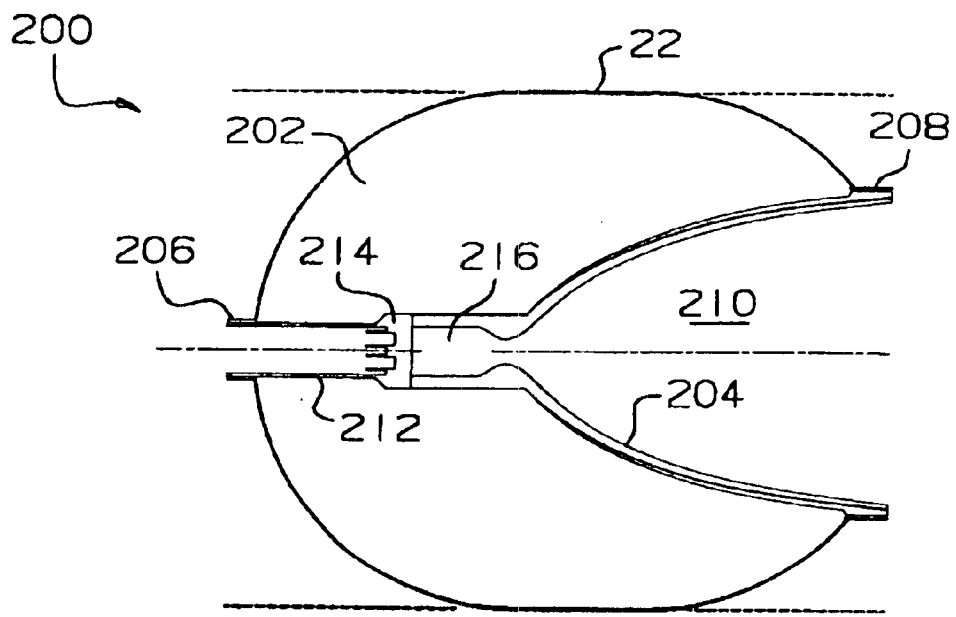
FIG. 4 is a sectional view of an aft portion of a vehicle incorporating an integrated tank and a conventional engine, according to the invention.

Referring to FIG. 4, a portion of a vehicle 200 incorporating an integrated tank 202 and engine 204 is shown. The engine 204 extends up into the tank 202 and one or both of the tank polar openings 206, 208 are sealed around the engine's exterior surface, while leaving the nozzle 210 exposed. A transition tube 212 may be used to allow access to the engine injector head 214.

In this configuration, the structure of the engine 204 must be capable of supporting the compressive loads of the pressurized fluid of the vessel 202. Fibers with a high compressive strength, such as boron, may be used in the fabrication of the nozzle 210 and its associated chamber 216. Syntactic foam or a ceramic-based material may be used on or in the nozzle 210 and chamber 216 to improve the compressive strength and stability of the engine's structure and insulate the stored fluid and surrounding structure from engine combustion heat. The use of an ablative chamber 216 or nozzle 210 may reduce or eliminate the need for insulation.

In order to allow vessel strain due to pressure to occur unimpeded by the engine assembly, the two structures may be uncoupled at one end, allowing the two structures to strain at different rates and translate with respect to each other. To prevent leakage between the two structures, a plastic or elastomeric liner maybe used to contain the fluid, or an O-ring, lip-type, rod packing type, or other seal may be used between the two translating surfaces as shown in FIGS. 2(a) through 2(c).

Figure 5:
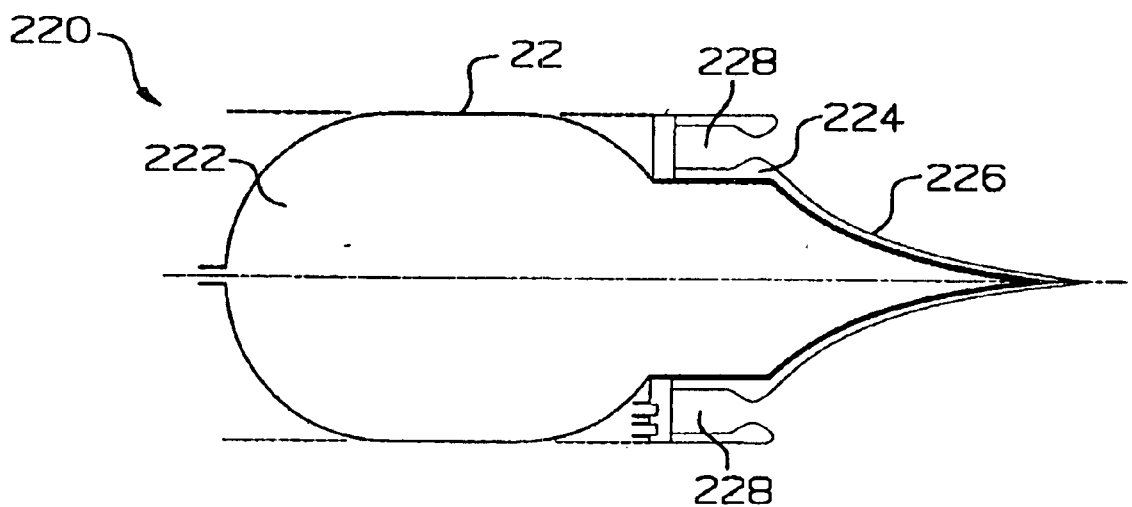
FIG. 5 is a sectional view of an aft portion of a vehicle incorporating an integrated tank and an aerospike engine, according to the invention.

Referring to FIG. 5, an alternative embodiment of the invention is shown, in which a vehicle 220 has a tank 222 integrated with an inverted or aerospike-type engine 224. The nozzle 226 is then configured around one end of the tank 222 with an annular chamber 228. In this configuration, the structure of the engine 224 should be capable of containing or assisting in the containment of the pressurized fluid of the tank 222.

If desired, tank-integrated thrust structure may be used in conjunction with the integrated engine to convey engine thrust and vehicle loads to the appropriate structure. With more complete engine integration, the tank dome into which a conventional engine would be inserted would have a relatively large polar opening and shorter, straighter, length of dome remaining. This dome may be adequately strong and stiff to transfer engine thrust to the cylindrical portion of the tank without any additional thrust structure.

Referring to FIGS. 6(a) through 6(e), several possible embodiments of an integrated tank, engine, and thrust structure are depicted. In the vehicle 230 shown in FIG. 6(a), the engine 204 is of a conventional type, as depicted in FIG. 4. A flared dome 232 supports the engine 204 within the tank 234, and also serves to transmit thrust to the outer wall 22 of the tank and into the main body 236 of the vehicle 230. The thrust load path 238 depicts the transmission of engine thrust force from the engine 204 to the main body 236. Consequently, the flared dome 232 and the outer wall 22 constitute the thrust structure of this embodiment. A rounded dome 239 is also provided on the forward side of the tank 234, encircling the transition tube 212. A gas inlet 14 and a fluid outlet 16 are provided in the rounded dome 239.

Figure 6A:
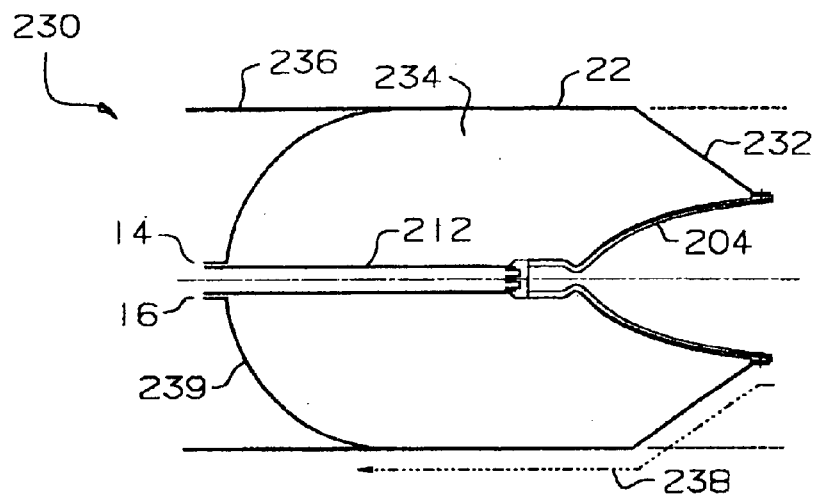
FIGS. 6(a) through (e) are sectional views of various embodiments of an aft portion of a vehicle or vehicle stage incorporating an integrated tank, pressurized thrust structure, and conventional engine according to the invention.
Figure 6B:
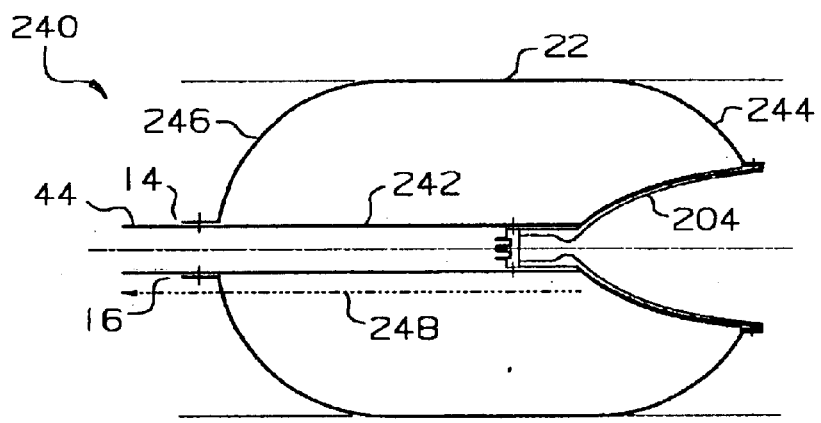

In FIG. 6(b), a vehicle 240 has been provided with a broader transition tube 242 to convey thrust from the engine 204. The flared dome of FIG. 6(a) has been replaced by a rounded dome 244, and the rounded dome 239 of FIG. 6(a) has been replaced by a rounded dome 246 with a larger opening to accommodate the enlarged transition tube 242. The thrust load path 248 travels simply along the transition tube 242 and will intersect with the main body (not shown) of the vehicle 240.

Figure 6C:
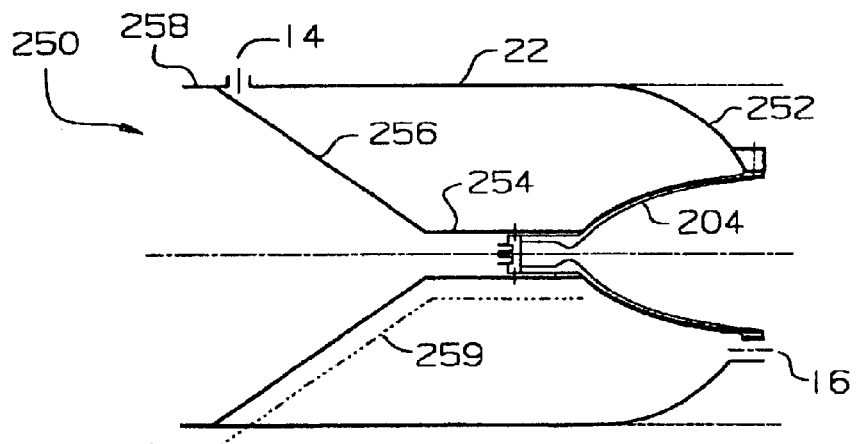

In the vehicle 250 of FIG. 6(c), the rounded dome 244 has been replaced by a rounded dome 252 with a fluid outlet 16 near the engine 204. A truncated transition tube 254 carries thrust loading from the engine 204 to a flared dome 256, which conveys the thrust to the main body 258 of the vehicle 250. Consequently, the thrust load path 259 extends through the transition tube 254 and the flared dome 256. A gas inlet 14 may be located on the outer wall 22.

Figure 6D:
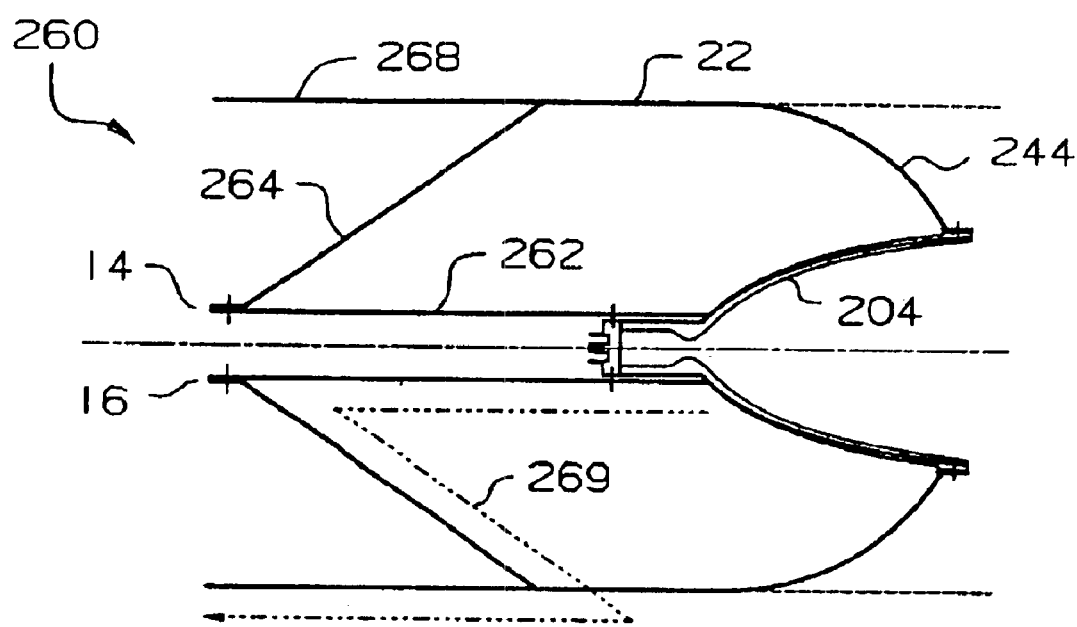

An alternatively embodied vehicle 260 is shown in FIG. 6(d). A rounded dome 244 is provided, as shown in FIG. 6(b). A transition tube 262 extends from the engine 204 to a tapered dome 264, in which a gas inlet 14 and a fluid outlet 16 are provided. The tapered dome 264 conveys thrust to the main body 268, such that the thrust load path 269 travels along the transition tube 262 and through the tapered dome 264 to reach the main body 268.

Figure 6E:
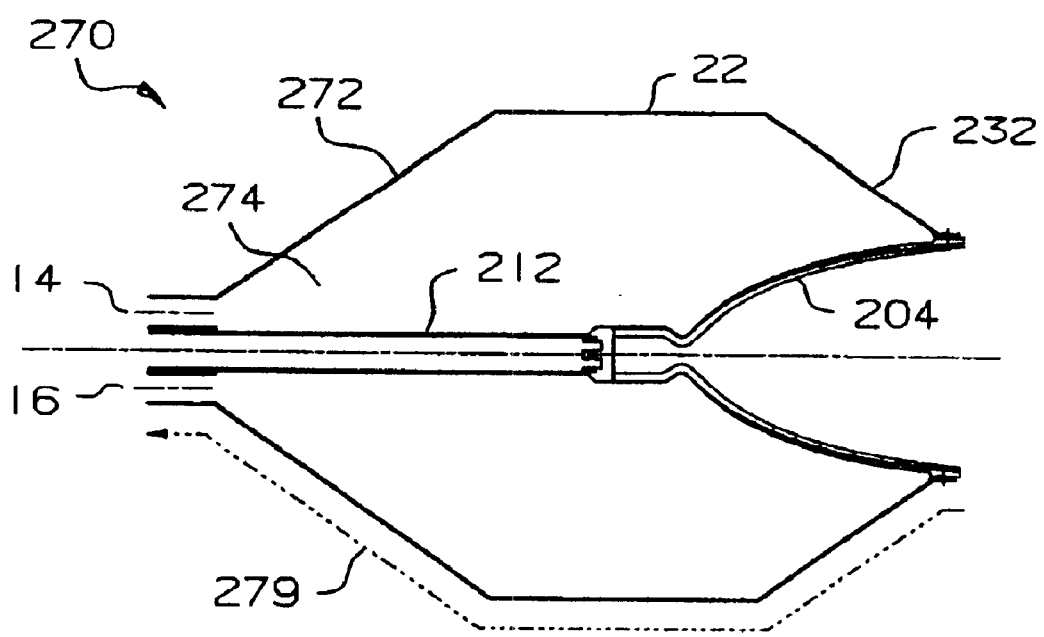

In FIG. 6(e), yet another configuration is shown in a vehicle 270. A flared dome 232 and a transition tube 212 are provided, as in FIG. 6(a). However, a tapered dome 272 transmits the thrust load back inward to reach the main body (not shown) somewhere forward of the tank 274. The thrust load path 279 thus travels through the flared dome 232, the outer wall 22, and the tapered dome 272. A gas inlet 14 and a fluid outlet 16 are provided in the tapered dome 272.

Figure 7A:
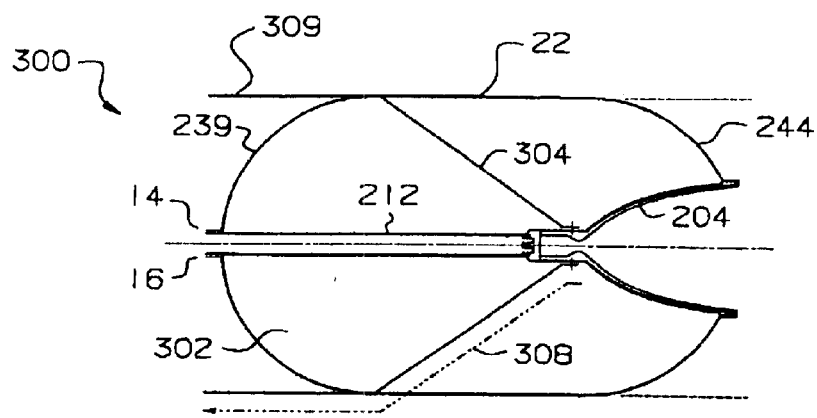
FIGS. 7(a) through (c) are sectional views of various embodiments of vehicle tankage and structure incorporating an integrated tank, thrust structure, and conventional engine, wherein the thrust structure is an internal feature of the tank.
Figure 7B:
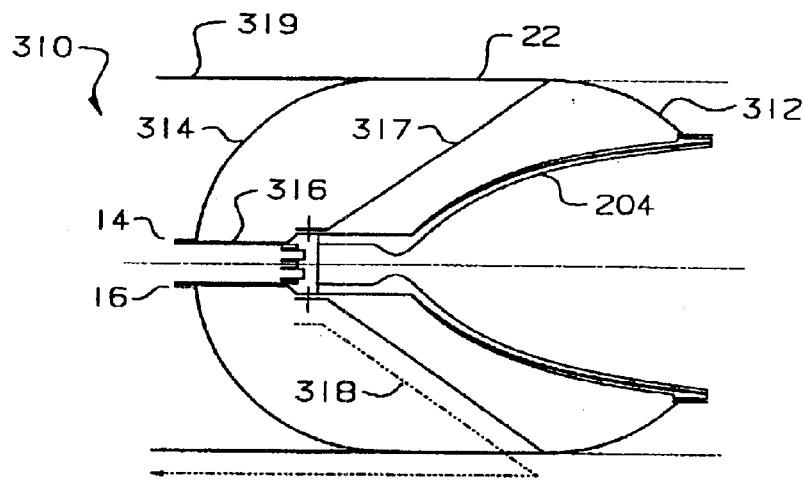
Figure 7C:
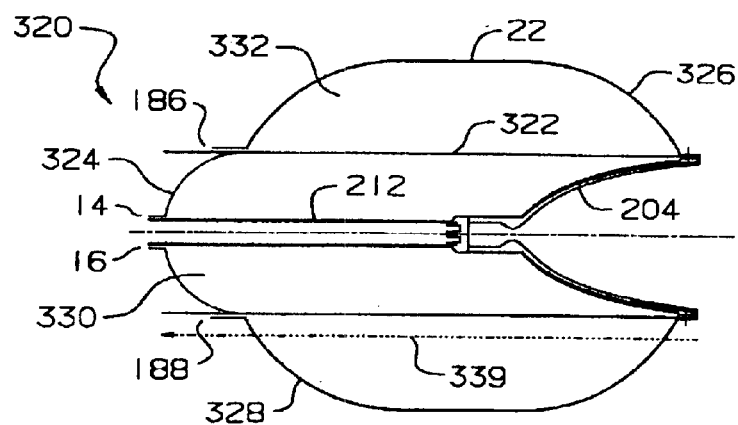

Referring to FIGS. 7(a) through 7(c), internal thrust structure may also be integrated into the tankage along with the engine. More specifically, in FIG. 7(a), a vehicle 300 similar to that of FIG. 3(a) is shown, with the addition of an engine 204 integrated with the tank 302. A flared internal support 304 is provided to convey a thrust load from the engine 204. A transition tube 212 extends through the rounded dome 239 at the forward end of the tank 302. The thrust load path 308 extends from the engine 204, through the flared support 304, to the outer wall 22, and to the main body 309. As with the configurations of FIGS. 3(a) and 3(b), vents (not shown) may be provided to permit fluid communication across the flared support 304.

In FIG. 7(b), the engine 204 is enlarged with respect to the vehicle 310. Accordingly, a smaller rounded dome 312 is provided to connect the engine 204 to the outer wall 22, and a shortened transition tube 316 is used to supply necessary fluids or control for the engine 204. The rounded dome 314 is also smaller, and may have a gas inlet 14 and a fluid outlet 16. A tapered support 317 extends from the engine 204 to the outer wall 22, so that the thrust load path 318 travels through the tapered support 317 and the outer wall 22 to reach the main body 319 of the vehicle 310. As with the configurations of FIGS. 3(a) and 3(b), vents (not shown) may be provided to permit fluid communication across the flared support 304.

In FIG. 7(c), a vehicle 320 having a configuration similar to that shown in FIG. 3(c) is shown, with an integrated engine 204. An interior wall 322 extends from the engine 204 to reach a rounded dome 324 with a gas inlet 14 and a fluid outlet 16. The rounded dome 324 also has an opening through which the transition tube 212 travels. A rounded annular dome 326 extends outward from the interior wall 322 to reach the outer wall 22, and a similar rounded annular dome 328 reconnects the outer wall 22 with the interior wall 322. Thus, a first tank 330 and a second tank 332 are formed.

A gas inlet 186 and a fluid outlet 188 in the second tank 332 provide for separate ingress and egress so that two separate fluids may be maintained. The thrust load path 339 travels through the interior wall 322 to reach the main body (not shown) of the vehicle 320.

Multiple tanks can also be integrated into one tank with multiple internal chambers through the use of internal bulkheads. Non thrust-load carrying, propellant-separating bulkheads that extend internally from the vessel's outer wall to a vessel dome may be integrated into the tank in the same way as internal thrust structure would. The large end of the bulkhead would be fixed to the tank wall and the smaller end allowed to translate through a dome fitting as shown in FIGS. 2(*a*) through 2(*c*). This would allow access to both fluids from the same vessel dome.

The preferred shape for this type of bulkhead would be domed or hemispherical with a cylindrical tube extension. The bulkhead may be metal, composite, plastic, or a combination of materials and may be designed to withstand pressure differentials between adjacent chambers or tanks. The inclusion of an integral extension tube reduces part count, eliminates joints and the need for flexible bellows, and minimizes potential leak paths.

Figure 8:
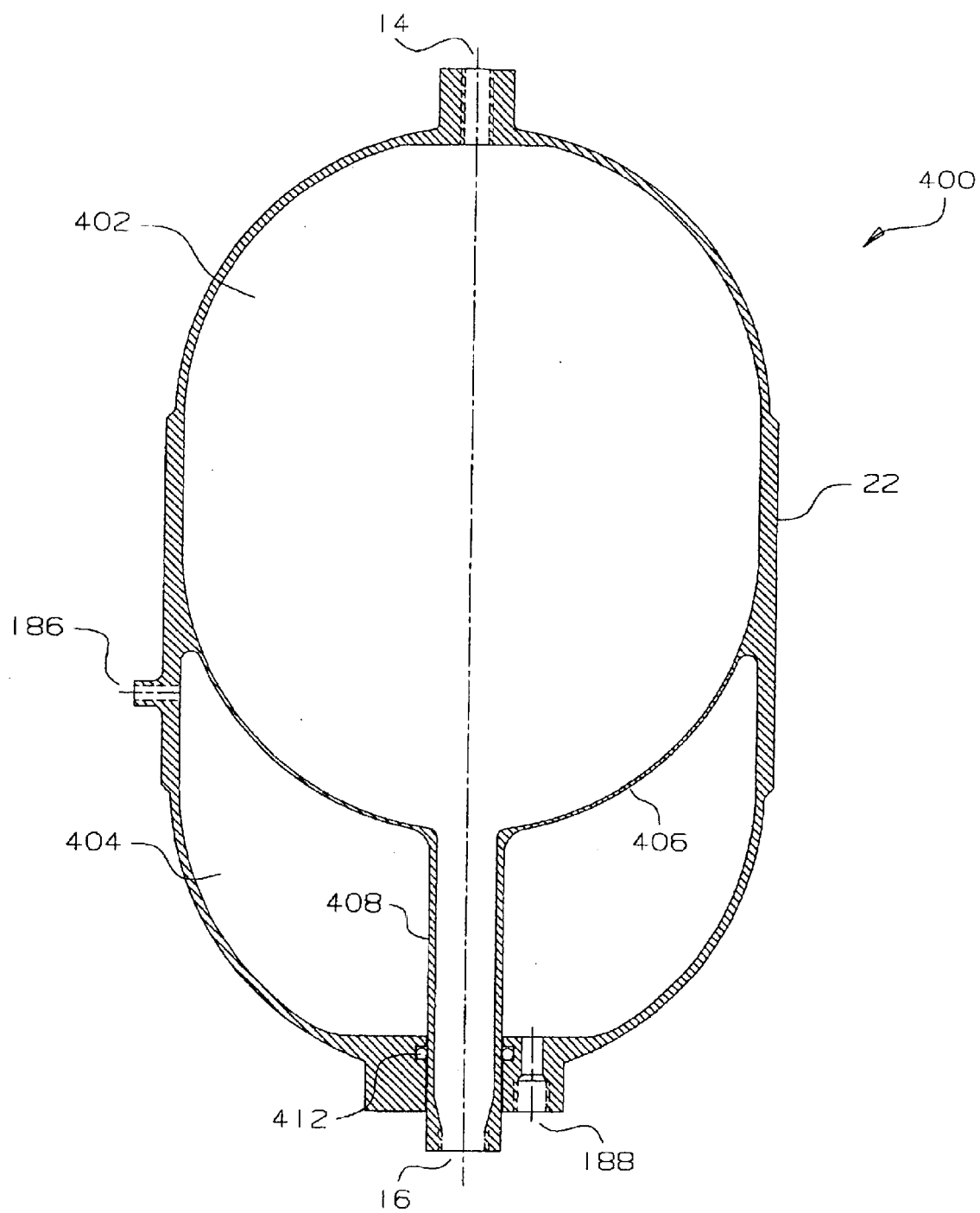
FIG. 8 is a sectional view of one embodiment of vehicle tankage and structure incorporating an integrated tank and rigid bulkhead with an integral extension tube extending from the forward chamber, or first tank, to the engine mount, and internally pressurized thrust structure, according to the invention.

Referring to FIG. 8, a vehicle 400 may have a first tank 402 and a second tank 404 with a common outer wall 22, separated by an integral bulkhead 406. The first tank 402 may have a gas inlet 14 and a fluid outlet 16, and the second tank 404 may similarly have a gas inlet 186 and a fluid outlet 188. An extension tube 408 carries fluid from the first tank 402 through the second tank 404 to reach the fluid outlet 16 of the first tank 402. The bulkhead 406 may be made thinner than the outer wall 22 because the fluids in the first and second tanks 402, 404 are both similarly pressurized. Consequently, the integrated bulkhead design has considerably less weight than designs with separate tanks. To save still more weight and space, a flared dome 410 of the second tank may act as a thrust structure 410 to convey thrust from the engine (not shown) to the outer wall 22 and the main body 411, similar to the embodiments described above.

Similar to prior embodiments, it may be desirable to permit the first and second tanks 402, 404 to flex and strain at different rates. Thus, a liner or other sealing element, as described in connection with FIGS. 2(*a*) through 2(*c*), may be included in an integrated tank and bulkhead embodiment. In FIG. 8, the second tank 404 is shown with an O-ring type seal 412 to sealably enclose the second tank 404 around extension tube 408, while permitting translation of the extension tube 408 within the second tank 404.

Figure 9:
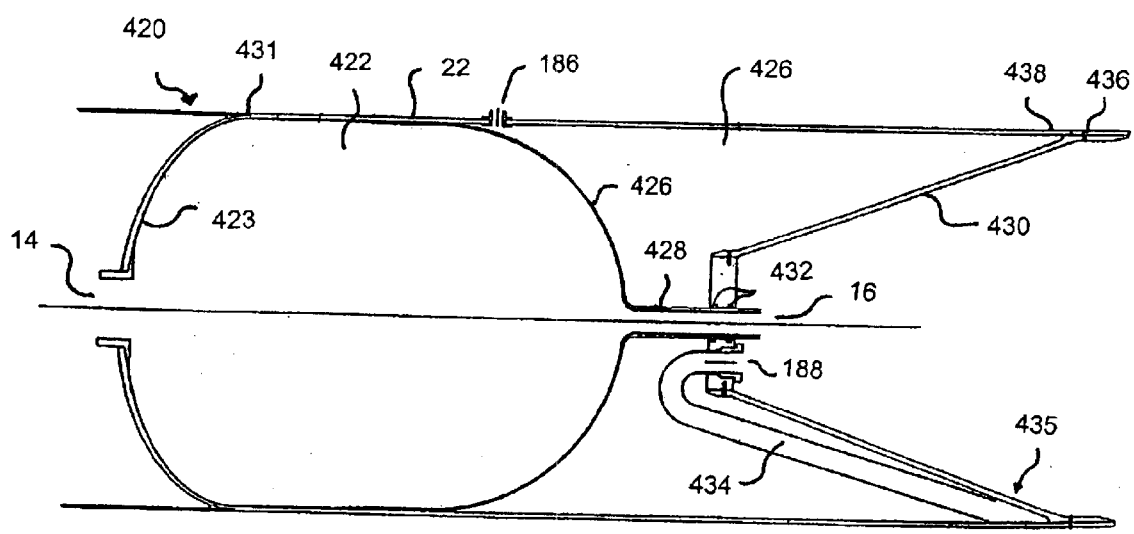
FIG. 9 is a sectional view of an alternative embodiment of an aft portion of a structure incorporating an integrated tank and rigid bulkhead with an integral extension tube, and externally pressurized thrust structure, according to the invention.

Referring to FIG. 9, an alternative embodiment of tankage integrated with a bulkhead is shown, incorporated in a vehicle 420. Once again, a first chamber 422, or first tank 422 with a liner assembly 423, and a second chamber 424, or second tank 424, share an outer wall 22 and are separated by a bulkhead 426. The words "chamber" and "tank" are substantially synonymous, since each chamber of a tank effectively constitutes an independent tank. The first tank 422 has a gas inlet 14 and a fluid outlet 16, connected to the first tank 422 by an extension tube 428. The second tank 424 also has a gas inlet 186 and a fluid outlet 188.

However, the flared dome 410 of FIG. 8 may be replaced by a tapered dome 430, which also conveys engine thrust load to the outer wall 22 and the main body 431, while acting as a pressure membrane for the second tank 424. An O-ring seal 432 may also be provided to seal the second tank 424 around the extension tube 428. The liner 423 may be integrated with the bulkhead 426 and extension tube 428.

The fluid outlet 188 may receive fluid from the second tank 424 via an access tube 434, connected at an aft portion 435 of the second tank 424. This may enable virtually all of the fluid from the second tank 424 to exit through the fluid outlet 188. The tapered dome 430 may be integrally formed with the outer wall 22, or fabricated separately and attached by known methods, such as fasteners 436. A seal 438 may also be provided to keep fluid from escaping the second tank 424 around the tapered dome 430.

Another configuration for a non-thrust load carrying, propellant-separating bulkhead is to fix both ends of the bulkhead (the outer diameter to the tank wall and the extension tube to a polar fitting in the pressurized membrane) and give the bulkhead a shape that would be more conducive to axial deflection. By doing this, the tank's pressurized membrane is free to expand as required while the bulkhead flexes and follows. This type of bulkhead may be metal, composite, plastic, elastomer, or a combination of materials and may be designed to withstand pressure differentials between the two chambers.

Figure 10A:
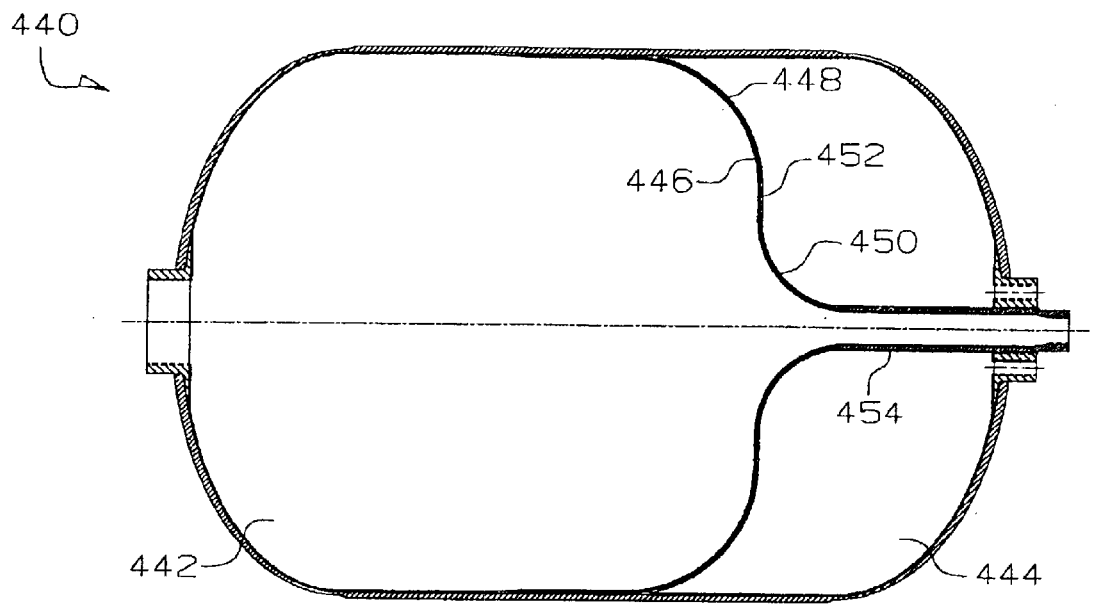
FIGS. 10(a) and (b) are sectional views of various embodiments of vehicle tankage and structure incorporating an integrated tank and rigid bulkhead with an integral extension tube, and externally pressurized thrust structure, according to the invention.
Figure 10B:
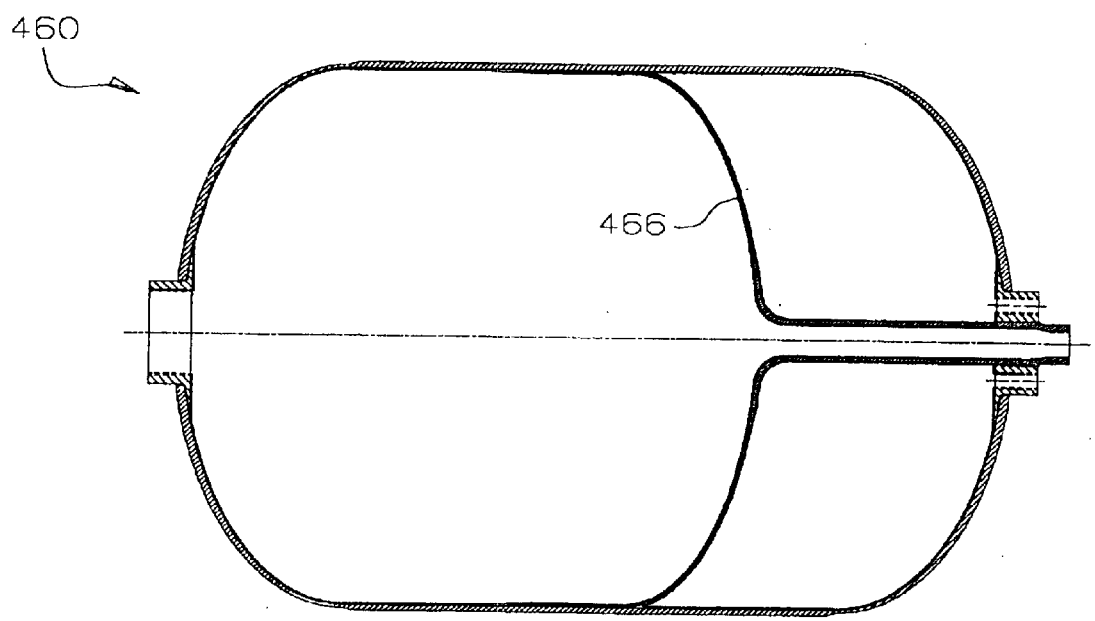

Referring to FIGS. 10(*a*) and 10(*b*), two such embodiments are shown, with integral flexible bulkheads. In FIG. 10(*a*), a vehicle 440 is shown, with a first chamber 442, or first tank 442 and a second tank 444, or second tank 444 separated by a bulkhead 446. The vehicle 440 is configured substantially as that of FIG. 9, aside from the bulkhead 446. The bulkhead 446 includes a convex radius 448 and a concave radius 450 separated by a flat portion 452. With this shape, the flat portion 452 may be pressed out from the first tank 442 or drawn into it, as dictated by the pressure differential between the first and second tanks 442 and 444. The inclusion of an integral extension tube 454 reduces part count, eliminates joints and flexible bellows, and minimizes potential leak paths.

In FIG. 10(*b*), a vehicle 460 is shown. The bulkhead 446 has been replaced with a bulkhead 466 with a basically elliptical shape. The elliptical shape may be stiffer than that disclosed in connection with FIG. 10(*a*). However, the stiffness of the bulkhead 446 or that of the bulkhead 466 may be modified to suit the requirements of the particular application.

A metal or composite liner assembly may be used wherein one dome is designed to function as a bulkhead between chambers. This dome would extend unsupported across the tank interior as a bulkhead and may be thickened as required to allow it to handle minor pressure differentials between adjacent chambers. A liner-integrated bulkhead may be designed and implemented as either a rigid or flexible bulkhead as described above. A metal, plastic, or elastomeric liner, or possibly no liner may be used in the adjacent chamber.

Non thrust-load carrying, propellant-separating bulkheads may be used without an extension tube if an engine or thrust structure extends into the tank cavity far enough to intersect the bulkhead's dome, or if access to both fluids from one end of the tank will not be required. The bulkhead dome may have no penetration through its membrane, or may terminate at the outer diameter of the inserted feature and either be allowed to translate with respect to the inserted feature or flex with the relative movement of the insert, depending on the shape and attachment scheme selected. Such a bulkhead is allowed to translate (not flex) with respect to the outer diameter of the engine insert. Liners for each chamber keep the two fluids separated without additional seals.

Figure 11:
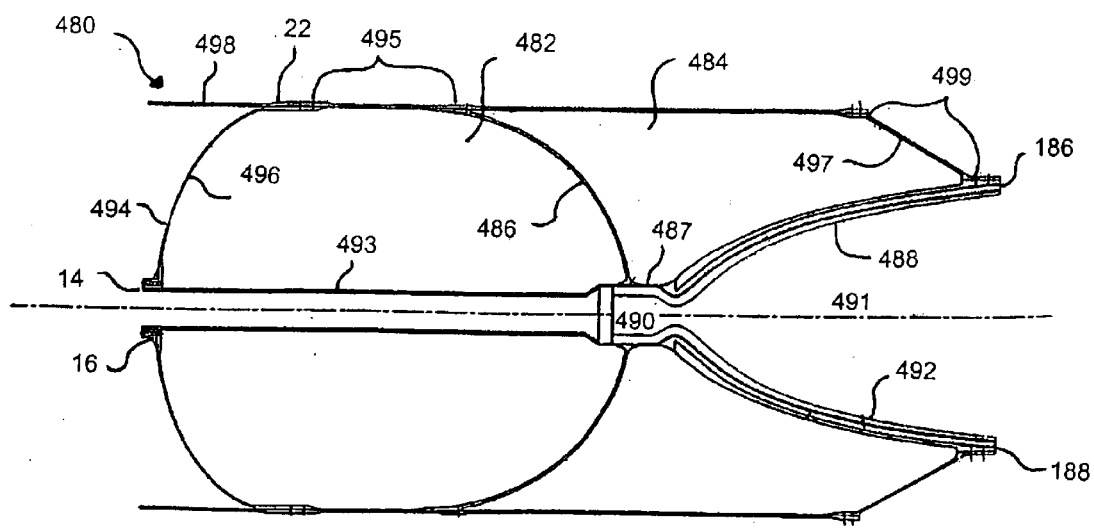
FIG. 11 is a sectional view of one embodiment of an aft portion of vehicle tankage and structure incorporating an integrated tank, a bulkhead without an extension tube, and an engine with an access tube through the tank according to the invention.

Referring to FIG. 11, such an embodiment is shown. A vehicle 480 operates without an extension tube. As with the previous embodiments, first and second chambers 482, 484, or first and second tanks 482, 484 are provided and separated by a bulkhead 486. A central opening 487 is formed in the bulkhead 486. An engine 488 is formed in the second tank 484, with a combustion chamber 490 extending through the central opening 487 and into the first tank 482. Gases from the chamber 490 exit through a nozzle 491 formed in the second tank 484. The nozzle 491 preferably includes a layer of insulation 492 to keep combustion heat from increasing the pressure or inducing reaction of volatile fluids within the second tank 484. An engine access tube 493 feeds the engine 488 with needed propellants and controls.

In this embodiment, a rounded dome 494 and the bulkhead 486 of the first tank 482 may be integrally fabricated with the outer wall 22, or separately fabricated and then affixed to an outer wall 22 by fasteners 495 or other known methods. A liner 496 may be provided in the first tank 482 to provide a more effective seal or easier manufacturing. A flared dome 497 may form an aft pressure membrane for the second tank 484, and may act as a thrust structure to convey engine thrust from the engine 488 to the outer wall 22 and the main body 498. The flared dome 497 may be formed integrally with the outer wall 22 or the engine 488, or may be attached to both via fasteners 499 or other known means. The bulkhead 486 may also be configured to act as a thrust structure.

It is conceived that the novel bulkhead structures of the present invention are not limited to use for propulsion vehicles. More particularly, hydraulic accumulators, rail car air brake reservoirs, water softeners, and other devices in which it is desirable to store two separate fluids may benefit from the novel integrated tankage and bulkhead designs of the present invention.

One or all of the components of the invention may be made of metal by weld fabrication, machining, spinning, hydroforming, casting, forging, plating or metal deposition, or any combinatin of the above. The preferred materials, however, are composites, utilizing carbon, aramid, boron, glass, silica, ceramic, or other reinforcing fibers in an organic matrix. Metal fittings, liners, bulkheads, and mechanical fasteners along with plastic or elastomeric liners, bladders, or coatings may be utilized in a predominantly composite structural assembly. The preferred method of manufacture of the basic structure is by filament winding, fiber placement, or hand-lay-up, or any combination of the above.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. An apparatus for storing a plurality of fluids, the apparatus comprising:
    a first tank having a first pressurized membrane substantially surrounding a first fluid;
    a second tank having a second pressurized membrane substantially surrounding a second fluid;
    a bulkhead sealably engaging the first and second pressurized membranes; and
    a rigid extension tube sealably engaging the bulkhead to convey fluid from the first tank through the second pressurized membrane, the rigid extension tube further being decoupled within the second tank to permit different rates of strain of the second tank and the extension tube.

2. The apparatus of claim 1, wherein the bulkhead is substantially rigid, and the rigid extension tube is translatably and sealably engaged by the second pressurized membrane by a seal mechanism chosen from the group consisting of an unbroken liner, an O-ring type seal, a lip type seal, and a rod packing type seal.

3. The apparatus of claim 2, wherein the seal mechanism comprises a liner supported by a compliant pad between the liner and a support structure to distribute liner strain.

4. The apparatus of claim 1, wherein the bulkhead is substantially flexible.

5. The apparatus of claim 4, wherein the bulkhead comprises a substantially elliptical shape.

6. The apparatus of claim 4, wherein the bulkhead is substantially integrated with a liner of the first tank.

7. The apparatus of claim 4, wherein the bulkhead further comprises:
    a concave radius;
    a convex radius; and
    a substantially flat portion disposed between the concave radius and the convex radius, the substantially flat portion being sized to permit alteration of a volume of the first tank.

8. The apparatus of claim 1, wherein the bulkhead is substantially rigid and is substantially integrated with a liner of the first tank.

* * * * *

UNITED STATES PATENT AND TRADEMARK OFFICE
CERTIFICATE OF CORRECTION

PATENT NO. : 6,745,983 B2
DATED : June 8, 2004
INVENTOR(S) : Zachary Taylor

It is certified that error appears in the above-identified patent and that said Letters Patent is hereby corrected as shown below:

Column 4,
Line 12, please delete "rigid" and replace with -- flexible --.
Line 13, please delete "and externally pressurized thrust structure".
Line 14, please delete "invention;" and replace with -- invention; and --.

Column 7,
Line 26, please delete "18" and replace with -- 118 --.

Column 8,
Line 30, please delete "FIG. 3(d)" and replace with -- In FIG. 3(d) --.

Signed and Sealed this

Seventh Day of September, 2004

JON W. DUDAS
*Director of the United States Patent and Trademark Office*